United States Patent
Freeman et al.

(10) Patent No.: US 7,096,157 B2
(45) Date of Patent: Aug. 22, 2006

(54) METHOD AND STRUCTURE FOR DIAGNOSTICALLY TESTING FILES IN A COMPUTER

(75) Inventors: Joseph W. Freeman, Raleigh, NC (US); Steven D. Goodman, Raleigh, NC (US); Randall S. Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/902,359

(22) Filed: Jul. 29, 2004

(65) Prior Publication Data

US 2006/0025965 A1 Feb. 2, 2006

(51) Int. Cl.
*G06F 19/00* (2006.01)
(52) U.S. Cl. .......................... 702/183; 713/2
(58) Field of Classification Search ........ 702/182–185, 702/188; 360/31; 711/4, 100; 713/2
See application file for complete search history.

(56) References Cited

U.S. PATENT DOCUMENTS

| 5,166,936 A | 11/1992 | Ewert et al. ............... 371/21.6 |
| 6,415,383 B1 * | 7/2002 | Colegrove et al. ............. 713/2 |
| 2003/0033308 A1 | 2/2003 | Patel et al. ................... 707/10 |

* cited by examiner

*Primary Examiner*—Edward Raymond

(57) ABSTRACT

There are many files in the current generation of computers, especially on the hardfile, that are not used or used only infrequently during operation. For instance, the system may contain many help text files which may never be accessed. The same applies to the DLL's. Also, some files are accessed only during a boot cycle. The present invention provides a method and program to track the locations of files in a computer which have been accessed so that, when an error occurs, only the files that need to be tested are diagnostically tested for errors, thus saving time and resources.

18 Claims, 5 Drawing Sheets

METHOD AND STRUCTURE FOR DIAGNOSTICALLY TESTING FILES IN A COMPUTER

FIELD OF THE INVENTION

This invention relates to testing of files in a computer, and more particularly to diagnostically testing selected files in a computer, mainly on a harddisk or other mass storage device.

BACKGROUND OF THE INVENTION

With the current computer diagnostics tests, it can take up to a minute per gigabyte to test the entire harddisk. Thus, it can be easily predicted that, as the hardfile sizes increase, the time to actually detect an error will become excessive. In fact, there are already problems where the user will not run diagnostics since it takes too long. What is needed is a method and structure to quickly selectively test the sectors on the hardfile or other computer storage devices to see if there are currently any problems.

SUMMARY OF THE INVENTION

There are many files in the present generation of computers that are not used, or used only infrequently during operation. For instance, the system may contain many help text files which may never be accessed. The same applies to the dynamic link libraries (DLL's). These are usually files that provide system interfaces/services for applications. Also, some files are accessed only during a boot cycle. The present invention provides a method and program to track the locations of files in a computer which have been accessed so that, when an error occurs, only the sectors associated with these files that need to be tested are diagnostically tested for errors, thus saving time and resources.

DETAILED DESCRIPTION OF THE PREFERED EMBODIMENT(S)

The present invention will be described in conjunction with the use thereof in diagnostic testing of the files contained in various individually addressable sectors of a hardfile in a computer. It is to be understood, however, that it can find use in any situation where the sectors of a mass storage device need to be tested individually, or in selected groups, rather than only as one predetermined group.

In a computer, in one embodiment of the invention, an IDE (integrated device electronics as defined in the ATA/ATAPI standard) hardfile contains a microcontroller which controls access to each file. According to this invention, this controller tracks when a sector/track (containing a file or a portion of a file) is accessed. An indication of the access is then stored somewhere in the hardfile system (preferably in an unused and hidden sector of the hardfile). When the user suspects an error, the diagnostic program, which conventionally is stored in the computer, can access the usage data and test only those portions of the hardfile which actually have been used. If the hardfile is okay, i.e. does not contain any errors, the usage table is reset so that the usage table will not grow too big over time. With this methodology, a method to supply quick diagnostics is provided which tests only those portions of the hardfile which actually have been used.

Figure 1:
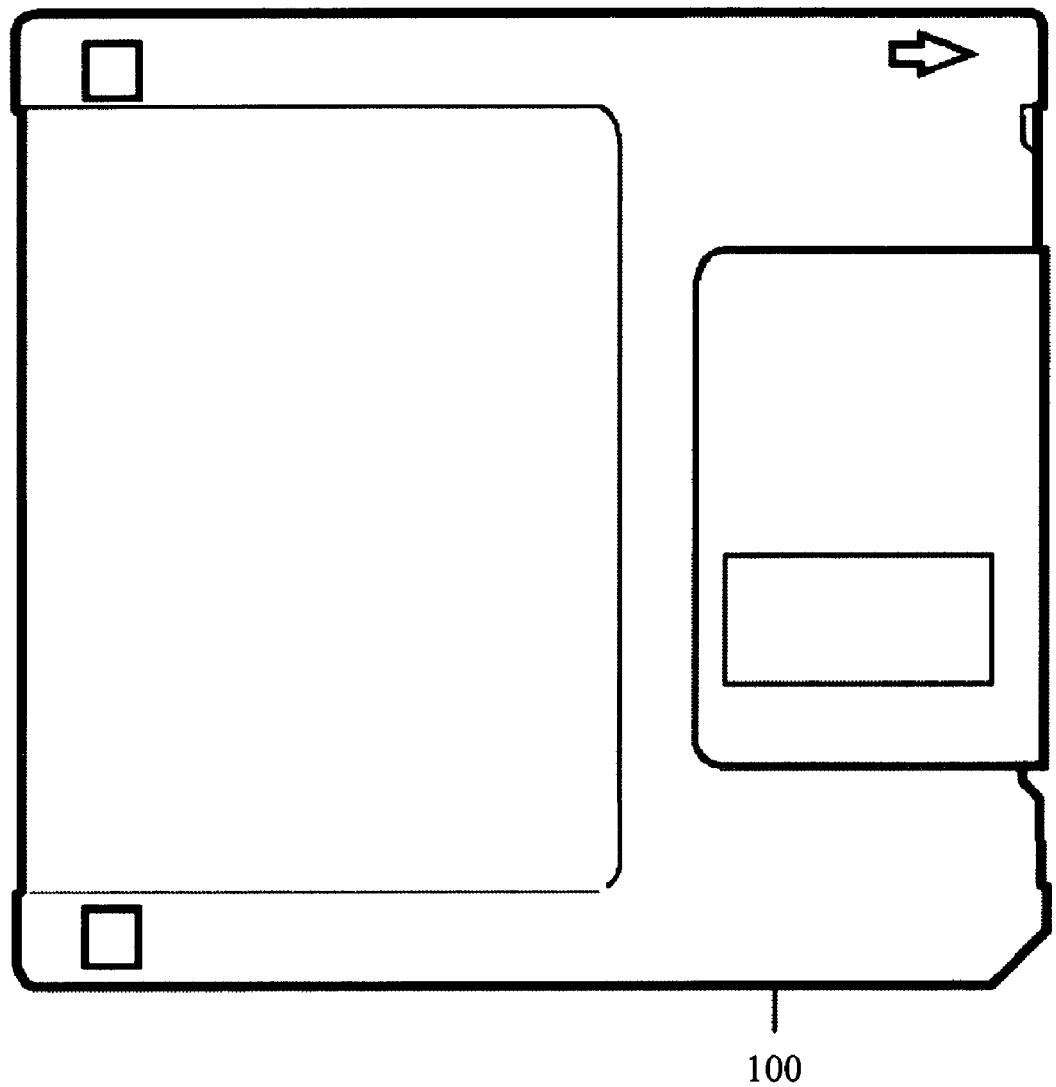
FIG. 1 is a somewhat schematic view of a floppy disc on which a program according to this invention can reside.

FIG. 1 shows a floppy disk 100 on which the program according to this invention resides. The program residing on floppy disk 100 is run by a computer, not shown. However, it is to be understood that the diagnostic programs of this invention can reside on other types of media such as, but not limited to, hardfile, memory key, CDROM, another computer and accessed via a network, etc.

Figure 2:
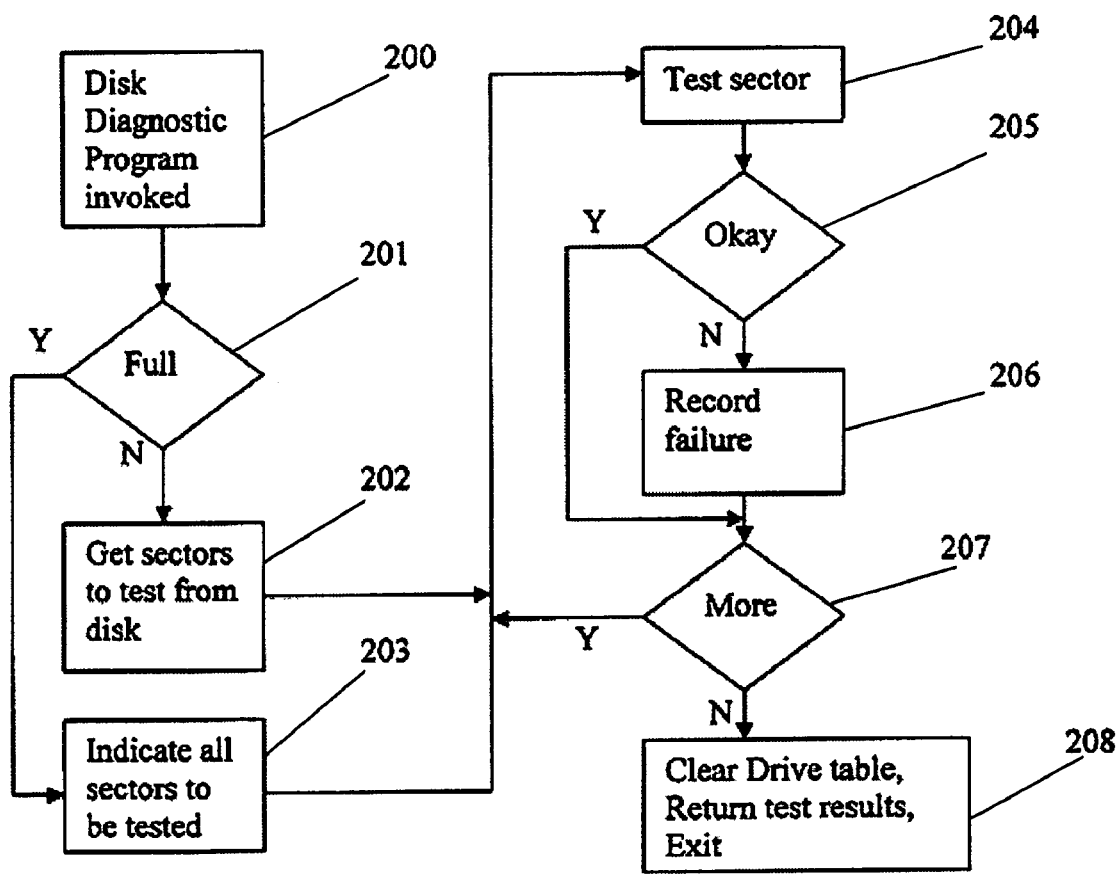
FIG. 2 is a flow chart of a diagnostic program according to one embodiment of this invention.

Referring now to FIG. 2, disk diagnostics are invoked by a user or application as shown in block 200. The diagnostics determine if the request is for a full test, i.e. all sectors are to be tested or, if for a quick test, i.e. selected sectors, block 201. If the request is for a full test, the diagnostic indicates a full test, block 203. If the request is for a quick test, the diagnostics retrieve the recently used sector information from the drive, block 202. The first sector is tested, block 204. If the test fails, i.e. a fault or failure is detected, the diagnostic records the failure, block 206, and then proceeds to determine if there are any more sectors to test, block 207. If the test at block 204 is successful, i.e. no faults or failures are detected, the diagnostics proceed to block 207 to determine if more sectors are to be tested. If at block 207 there are more sectors to test, the diagnostics indicate the next sector to be tested and return to block 204. If all selected sectors have been tested, the diagnostics return the results to the caller and exit, block 208. If no failures are detected, the listing of sectors to be tested can be deleted. If a failure in a given sector is detected, that sector may be disabled or deactivated so that it cannot be accessed until the failure has been corrected, or other action may be taken.

Figure 3:
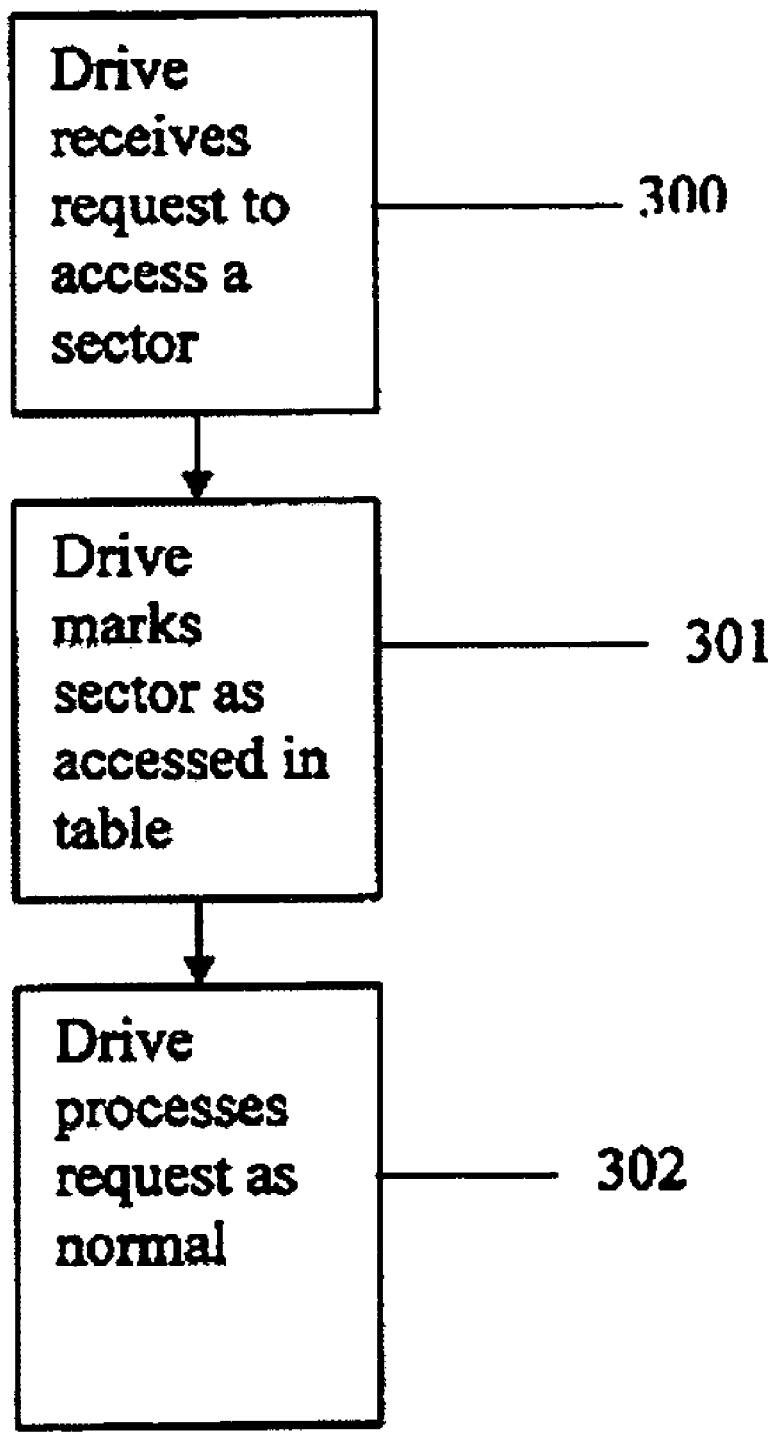
FIG. 3 is a flow chart of the drive processing (read/write) of the program of FIG. 2.

Referring now to FIG. 3, this shows the additional processing required to be added to the normal drive processing. In block 300, the drive receives a request to access a sector (read data or write data). The drive records the sector as having been accessed in the internal table, block 301. The drive then proceeds to process the request as it would prior to this invention (i.e., returns data from the specified sector to the system or writes the data from the system to the specified sector).

Figure 4:
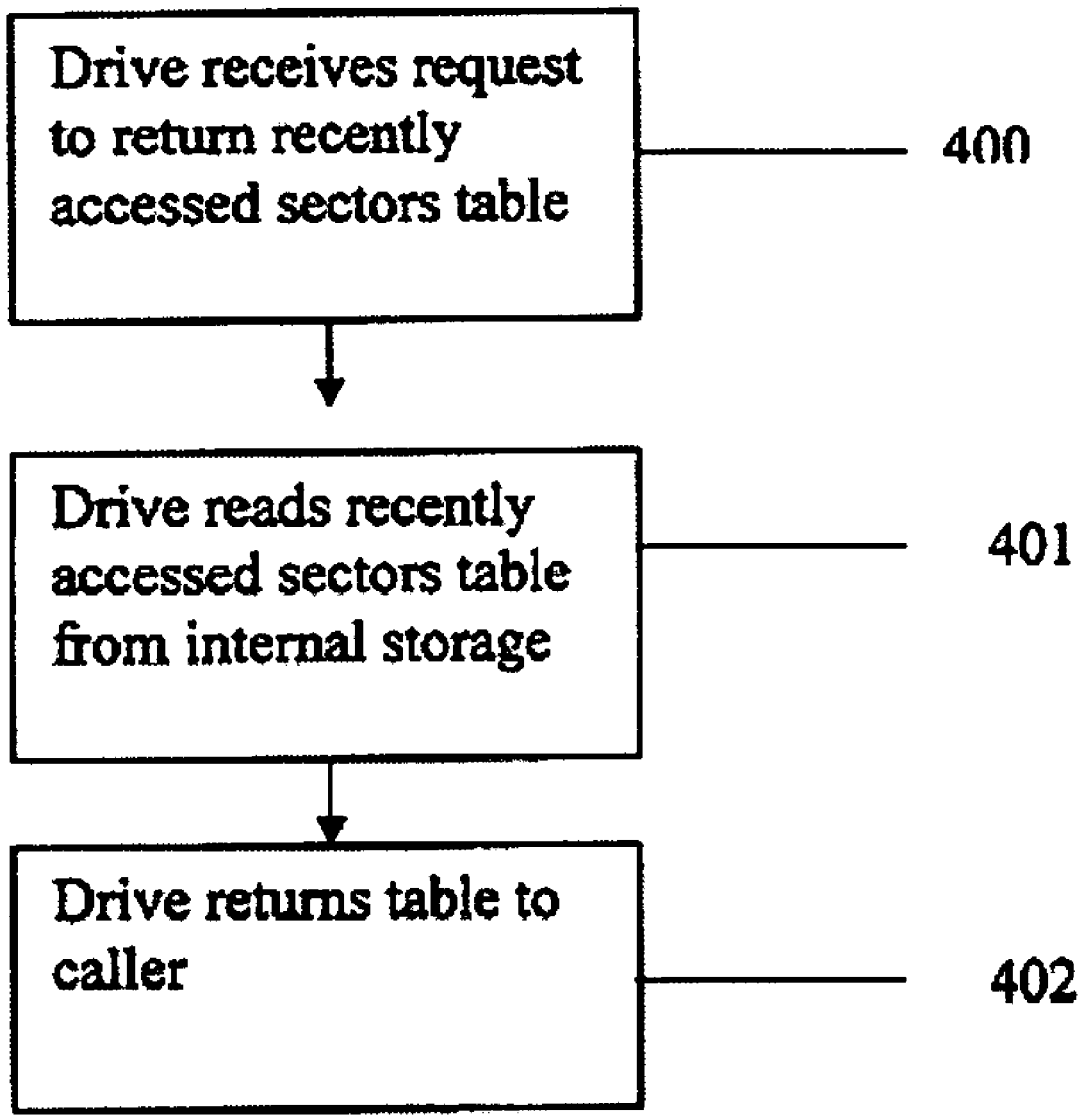
FIG. 4 is a flow chart of drive return diagnostic command processing of the program of FIG. 2.

Referring now to FIG. 4, this describes the drive processing for returning the recently accessed sector information. The drive receives a command to return the recently accessed sector information in block 400. This command can be sent by the diagnostics program if it is to perform a quick diagnostic. In block 401, the drive retrieves the information created by block 301 (see FIG. 3) from internal storage (storage could be magnetic media, eeprom, etc.). In block 402, the drive returns the data to the caller.

Figure 5:
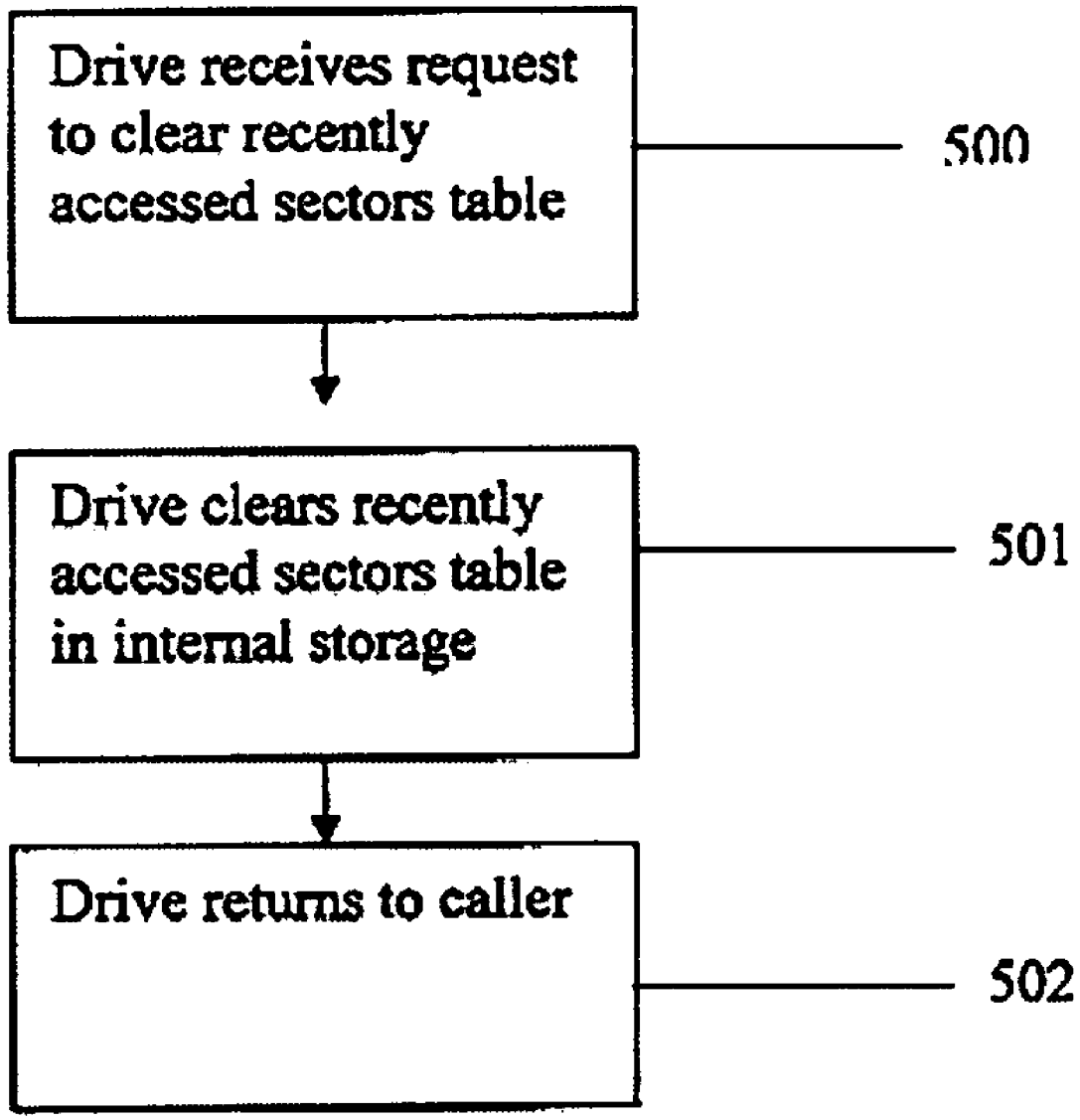
FIG. 5 is a flow chart of drive processing for clearing of recently used files of the program of FIG. 2.

Referring now to FIG. 5, this describes the processing for a request to clear the recently used sectors information. The drive receives a command to clear the recently accessed information in block 500 (this command can be sent by the diagnostics program after testing in block 208 (FIG. 2). In block 501, the drive clears the information created by block 301 (FIG. 3) in internal storage (storage could be magnetic media, eeprom, etc.). In block 502, the drive returns to the caller.

Thus, a program for selectively diagnostically testing various sectors is provided so that diagnostics do not have to be run on all of the sectors if some of the sectors could not have contributed to failure currently under investigation.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A method of diagnostic testing one or more individually addressable sectors from a group of sectors contained in a main storage device in a computer comprising the steps of:
   keeping a record of any sectors which have been addressed together with any errors found and deselecting only that sector where an error has been found with no substitution therefor;
   selecting the sector or sectors to be diagnostically tested from those sectors which have been addressed and are not deselected;
   performing the diagnostic testing only on the selected sector or sectors; and
   returning the test results.

2. The method as claimed in claim 1 wherein said selected sector or sectors are marked.

3. The method as claimed in claim 1 wherein the identity of said selected sector or sectors is stored in the computer and periodically deleted and another selection is made.

4. The method as defined in claim 3 wherein the selection of sector or sectors is made after each boot cycle of said computer, and the selected sector or sectors are deleted at the termination of each said boot cycle.

5. The method as claimed in claim 1 wherein said files are contained in sectors on a harddisk in the computer, and the selected sector or sectors to be tested are listed in a sector on said harddisk.

6. The method as claimed in claim 1 wherein any number of sectors, including all the sectors, may be selected.

7. The method as claimed in claim 1 wherein said results of said testing are returned to an operator for further action.

8. The method as claimed in claim 1 wherein said selection is run under the control of said computer.

9. The method as claimed in claim 1 wherein said selection is under the control of an operator.

10. Computer readable media having thereon a method of diagnostic testing one or more individually addressable sectors from a group of files contained in a main storage device in a computer comprising the steps of:
    keeping a record of any sectors which have been addressed together with any errors found and deselecting only that sector where an error has been found with no substitution therefor,
    selecting the sector or sectors to be diagnostically tested from those sectors which have been addressed and are not deselected;
    performing the diagnostic testing only on said selected sector or sectors; and
    returning the test results.

11. The method as claimed in claim 10 wherein said selected sector or sectors are marked.

12. The method as claimed in claim 10 wherein the identity of said selected sector or sectors is stored in said computer and periodically deleted and another selection is made.

13. The method as defined in claim 12 wherein said selection of sectors is made after each boot cycle of said computer, and said selected sectors are deleted at the termination of each said boot cycle.

14. The method as claimed in claim 10 wherein said files are contained in sectors on a harddisk in said computer, and said selected files to be tested are listed in a sector on said harddisk.

15. The method as claimed in claim 10 wherein any number of sectors, including all of said sectors, may be selected.

16. The method as claimed in claim 10 wherein said results of said testing are returned to an operator for further action.

17. The method as claimed in claim 10 wherein said selection is run under the control of said computer.

18. The method as claimed in claim 10 wherein the selection is run under operator control.

* * * * *